United States Patent Office 3,437,632
Patented Apr. 8, 1969

3,437,632
POLYCARBONATE RESINS CONTAINING GLASS FIBERS SIZED WITH POLYCARBONATES
Wilhelm Hechelhammer and Hugo Streib, Krefeld-Bockum, Germany, assignors to Farbenfabriken Bayer Aktiengesellschaft, Leverkusen, Germany, a German corporation.
No Drawing. Filed Nov. 25, 1964, Ser. No. 414,009
Claims priority, application Germany, Nov. 30, 1963, F 41,439
Int. Cl. C08g 51/10, 39/04
U.S. Cl. 260—37              14 Claims

ABSTRACT OF THE DISCLOSURE

Polyarylcarbonates containing glass fibers which have been sized with a polyarylcarbonate resin and prepared by mixing a polycarbonate with a glass fiber which has been sized with a polyarylcarbonate.

---

This invention relates to the production of glass fiber reinforced polycarbonate and more particularly to an improved polycarbonate containing glass fiber and an improved process for the preparation thereof.

It is known to incorporate glass fiber into polycarbonates. The incorporation of glass fibers into polycarbonate improves certain properties. However, the high molecular weight thermoplastic polycarbonates such as those described in British Patents 772,267, 808,485, 808,486 and 808,487 are not satisfactorily reinforced with commercially available glass fiber products. The glass fibers usually contain some sizing agents such as polyvinyl acetate, starch, chromium complex compounds, polyamides, epoxy resins, butadiene styrene copolymers, silanes and the like. These sizings have proven to make the glass fibers unsatisfactory for incorporation into a polycarbonate for reinforcement because discoloration occurs. Moreover, the dimensional stability of the polycarbonate is harmed by the presence of these sizing agents due to decomposition of the polycarbonate molecules so that the improvements expected from the incorporation of glass fiber are reduced or not present at all.

It is not possible to prepare glass fibers without the use of sizings. Therefore, some sizing is necessary which will be sufficiently wetted by the polycarbonate melt to cause the glass fibers to be firmly welded together without deterioration of the polycarbonate.

It is therefore an object of this invention to provide an improved polycarbonate containing glass fibers and an improved method of preparing such polycarbonates. A further object of this invention is to provide an improved injection molding compound based on polyarylcarbonates which contain glass fiber material. Still another object of this invention is to provide a glass fiber sized in such a way that it will not cause deterioration of the polycarbonate and one which will improve the wettability of the fiber so that it will be more firmly bound together by the polyarylcarbonate. Still another object of this invention is to provide an improved method of incorporating glass fibers into polyarylcarbonate.

The foregoing objects and others which will become aparent from the following description are accomplished in accordance with the invention, generally speaking, by providing polyarycarbonate which contain glass fibers which have been sized with polyarylcarbonates. Therefore, the present invention provides for polyarylcarbonates prepared by mixing, either by milling or in the melt, a polyarylcarbonate with glass fibers of various sizes and shapes which have been previously sized with a polyarylcarbonate.

By glass fiber materials, it is to be understood that glass silk, as well as all glass fiber materials derived therefrom including glass fiber fabrics, rovings, stable fibers and glass fiber mats are included. In the production of glass fiber materials, glass batch is melted in continuous furnaces and usually formed into glass marbles. The glass marbles are then processed in a continuous filament operation by remelting them in small electric furnaces fitted with perforated platinum bushings on the lower face through which the glass flows by gravity. The fibers are taken up on a high speed winding device which draws the molten glass down to a fiber very much smaller than the diameter of the aperture through which it originally flowed. Fabrics woven from the glass yarn or the yarn itself may be treated with the process of the present invention. Alternately, the glass yarn may be subjected to heat cleaning, to remove organic material and release internal stresses of the yarn as well as to set the weave and give a limp hand and excellent draping quality to the fabric. The polycarbonate sizing of the present invention is advantageously applied at this stage in the production of the glass fibers. The polycarbonate sizing may be applied, however, at any stage in the production of fibers in order to overcome their submicroscopic porosity and high water vapor absorptivity.

Fibrous glass textiles which are suitable for electric purposes, which are resistant to chemical attack and preferably having a filament diameter between about 10 and about 80 inches $\times 10^{-5}$ are very suitable for use in accordance with the present invention.

Fibrous glass fabrics produced in accordance with the invention are useful for the manufacture of marquisette curtains and heavier printed and dyed drapery fabrics. They are also suitable for water-proofing applications and in the manufacture of glass insect screening as well as chemical applications as a filtering medium.

Any suitable polycarbonate and preferably a polyarylcarbonate and most preferably mixed polyarylcarbonates may be used for sizing the glass fibers in accordance with the present invention. Suitable polycarbonates for use as sizing are disclosed, for example, U.S. Patent 3,028,365; British Patent 808,485; German Patent 1,007,996; U.S. Patent 2,997,459; British Patent 772,627; British Patent 808,486 and British Patent 808,487. As is evident from the patents, polycarbonates and preferably polyarylcarbonates to be employed as sizing in accordance with the present invention may be produced from aromatic phenols especially alkylidene bisphenols, alkylidene bishydroxy cycloalkanes, bis(hydroxy phenyl)ethers, bis(hydroxy phenyl)sulfides, bis(hydroxy phenyl)sulphones, bis(hydroxy phenyl)sulfoxides and the like. It is also possible to use as sizing materials the polycarbonates based on mixtures of the foregoing bisphenols and the like with aromatic, aliphatic or cycloaliphatic dihydroxy compounds. In accordance with a preferred embodiment of the present invention, it has been found that polycarbonates based on beta-alkenyl substituted aromatic dihydroxy compounds, especialy those polyarylcarbonates where the beta-alkenyl substituted aromatic dihydroxy compound amounts to up to about 25 mol percent of the total aromatic dihydroxy compound employed. Such high molecular weight polyarylcarbonates are disclosed in Belgium Patent 544,222. They can be produced by reacting a suitable mixture of a bisphenol such as 2,2-bis-(4-hydroxy phenyl)propane with up to about 25 mol percent of the total requirement of the phenol compound of a beta-alkenyl substituted aromatic dihydroxy compound such as 3-monodiallyl-4,4'-dihydroxy diphenyl or the like as more particularly set forth below.

The polycarbonate sizing which is applied to the glass fibers as pointed out below in solution or emulsion form is prepared by the well known and conventional methods reported in the foregoing patents and preferably based on the following raw materials. If the polycarbonate is prepared directly from phosgene and a bisphenol, it is satisfactory to dissolve the bisphenol in aqueous caustic as disclosed in German Patent 959,497 and form a polymer by introduction of phosgene. By combining the aqueous caustic solution with a solvent for the polymer, a growing polymer chain dissolves in the organic phase and the ionic ends continue to grow in the aqueous phase. After removal of the water and solvent a high grade polymer having an intrinsic viscosity of about 0.5 to about 1.5 in dioxan at 30° C. in essentially quantative yield is obtained. Alternately, the polycarbonate may be produced by the transesterification route wherein a diarylcarbonate is reacted with a dihydroxy aromatic compound under conditions which favor the removal of the phenolic by-products in a well-stirred vacuum kettle. The polycarbonates are well known and the foregoing is set forth to aid in understanding the type of polycarbonates which are most suitable for use in accordance with the present invention. In the process, any suitable aromatic dihydroxy compound may be used such as, for example, hydroquinone, resorcinol, pyrocatechol, 4,4'-dihydroxy diphenyl, 1,5-dihydroxy naphthylene, alkylidene bisphenols, di(hydroxy phenyl) ethers, di(hydroxy phenyl) sulfides, di(hydroxy phenyl) sulfoxides, di(hydroxy phenyl) sulfones and the like; ethylene glycol, diethylene glycol, polyethylene glycol 400, thiodiglycol, ethylene dithiodiglycol, propane diol-1,2, propane diol-1,3, butane diol-1,3, butane diol-1,4, 2-methylpropane diol-1,3, pentane diol-1,5, hexane diol-1,6, octane diol-1,8, 2-ethyl hexane diol-1,3, decane diol-1,10, quinitol cyclohexane diol-1,2, o-, m- and p-xylene glycol, 2,2-bis(4-hydroxy cyclohexyl) propane, bis-4-hydroxy cyclohexyl) methane, 2,6-dihydroxy decahydronaphthylene. Typical of the beta-alkenyl substituted aromatic dihydroxy compounds are mono- and diallyl and methallyl hydroquinone, 3-mono- and 3,3'-diallyl and methallyl 4,4'-dihydroxy diphenyl, 3-mono and 3,3'-diallyl and methallyl compounds of bis(4-hydroxy phenyl) alkanes such as bis(hydroxy phenyl) methane, ethane, propane, butane, cyclohexane and the like as well as the bis(4-hydroxy phenyl) ethers, sulfides, sulfoxides and sulfones.

The sizing operation is carried out preferably by treating the glass fibers or the glass fiber textile with dilute solutions or emulsions of the polycarbonate. It is preferred to use a solution or an emulsion which contains from about 0.5 to about 5% by weight of the polycarbonate. Suitable solvents are for example, aromatic hydrocarbons such as benzene, toluene, xylene or the like but it is preferred to use low boiling chlorinated aliphatic hydrocarbons such as, for example, methylene chloride, ethylene chloride, chloroform, carbontetrachloride and the like. It is also possible in accordance with the invention to use the low boiling solvents in combination with high boiling solvents such as monochlorobenzene, dichlorobenzene, anisole or the like. Aqueous polycarbonate dispersions suitable for use in accordance with the present invention are described in German Patent 1,041,245.

The most preferred sizing for glass fibers for use in accordance with the present invention are polycarbonates based on mixtures of aromatic dihydroxy compounds free of substitution with up to about 25 mol percent of beta-alkenyl substituted aromatic dihydroxy compounds. A most preferred sizing is based on from 0.5 to 5 mol percent of 2,2-bis(4-hydroxy-3-allyl phenyl)-propane and from 99.5 to 95 mol percent of 2,2-(4-hydroxy phenyl)-propane or 1,1-bis-(4-hydroxy phenyl)cyclohexane.

The size content of the fibers according to the invention should amount from about 0.1 to about 5 and preferably from about 0.1 to about 3 percent by weight.

The deterioration of the polyarylcarbonate materials upon incorporation of the sized glass fiber material is greatly improved and usually not at all present when the glass fiber sized with polycarbonate is used. The glass fiber material or the glass fiber containing melt can also contain glass powder, quartz products, pigments, dyestuffs, fillers such as graphite, molybdenum disulphide or other synthetic resins such as polytetrafluoroethylene and other related products or other natural products such as cotton, sisal, asbestos, or synthetic fibers which are stable during the residence in them elt of polycarbonate and which do not damage the polycarbonate. Metal fibers and metal powders can also be incorporated.

Any suitable method of incorporating the glass fiber which has been sized with the polycarbonate as taught above can be used for incorporating the glass fiber into the polycarbonate such as milling, mixing the sized glass fibers in the melt or the like. A particularly suitable method of incorporating the sized glass fibers into the polyarylcarbonate is to introduce the glass fiber into the melt of the polycarbonate and extrude the resulting mixture in the form of bristles which are comminuated to form a granulate. Such a process can be carried out to advantage in an extruder by introducing the sized glass fiber into the melt at a point along the worm where the synthetic resin is not under pressure through any suitable opening, for opening, for example, through one of the usual degassing pipe sockets. The mixing of the glass fiber material with the polycarbonate takes place subsequently to the introduction through the degassing pipe and a granulate is produced by extrusion which contains preferably from 1 to 60% by weight of the granulate of glass fiber. However, the glass fiber may be introduced into the melt in other devices which permit a uniform mixing of the sized glass fiber material with the molten polycarbonate. The polycarbonate can be introduced into the extruder or other mixing device as a granulate or a powder or even in the molten state. The glass fiber to be used can be chopped glass silk or any desired fiber length, but it is preferably of a fiber length of 0.1 to 10 mm. so that it can be continuously introduced into the synthetic resin melt and uniformly dispersed therein. The glass fibers can also be introduced continuously into the extruder in a non-chopped state directly from the rovings or a spun or woven staple fibers whereby the glass fiber hanks are comminuted to a suitable length by the mixing device itself. For example, by the worm of an extruder, if this is the mixer used. It is most preferred to use glass fibers which have an average length of 0.1 to 3 mm. which are uniformly distributed through the polycarbonate and which become thoroughly wetted and firmly bonded together thereby. It is preferred to extrude the polycarbonate which has been mixed in the melt in an extruder with the sized glass fiber and extrude the glass fiber containing polycarbonate as a bristle which is wound upon a rotating metal drum filled with water and to then chop the bristle into granules which preferably have a bristle size of $\frac{1}{16}$-inch to $\frac{1}{8}$-inch diameter and are of varying length usually about $\frac{1}{8}$ of an inch.

The polyarylcarbonates to be filled with the glass fibers of the invention may be prepared for example according to the process of U.S. Patent 3,028,365 or U.S. Patent 3,153,008. The preparation of the polycarbonates for the sizing as disclosed above can also be used for the preparation of the polycarbonates which are to be filled with the sized glass fibers.

The glass reinforced polycarbonates of the invention are useful where such materials have been used heretofore particularly for the preparation of moldings, including gear wheels, casings for power tools such as casings for electric drills and the like.

The invention is further illustrated by the following example in which the parts are by weight unless otherwise specified. The example illustrates the improvement in the product of the present invention compared with a product filled with glass fibers which have a chromium filled glass sizing.

EXAMPLE

In each case a sized glass staple fiber of about 3 mm. length is incorporated with the polycarbonate melt. The glass fibers contain about 1.2 to 2% of sizing. The glass fiber content of the melt amounts to about 38 to 39%. From the melt there is produced in the usual manner, a bristle and from this a granulate. The granulate is worked up to test bodies by the injection molding process. In the following summary, the results for the material provided with the commercially available staple fiber are given under (a) and the results for the material obtainable by the process according to the invention under (b).

|  | (a) | (b) |
|---|---|---|
| Relative viscosity of a 0.5% solution in methylene chloride at 25° C. of— | | |
| The starting material | 1.313 | 1.313 |
| The granulate | 1.217 | 1.276 |
| The test body | 1.152 | 1.250 |
| mpact strength, cm. kg./cm.$^2$ | 28.3 | 36.8 |
| -module | 94,000 | 76,000 |

The polycarbonate melt is prepared by reacting about equal molar proportions of 2,2-bis-(4-hydroxy phenyl)-propane with diphenyl carbonate. The resulting polyarylcarbonate has a relative viscosity at 25° C. in approximately a 0.5% by weight solution in methylene chloride of 1.313.

The glass fibers are sized according to the following procedure: Glass marbles with a low alkali content are melted and continuously spun into filaments of about 10 microns thickness. A short distance from the nozzle the individual fibers are drawn on a rotating roller through a trough. The trough contains an aqueous emulsion of polyaryl carbonate which wets the individual fibers. After leaving the roller surface, about 100 individual fibers are combined into a fiber bundle which is spooled. The sized content is about 1.2 to 2%. The fibers are not sticky and possess a high gloss. The aqueous emulsion of polycarbonate is prepared by mixing about 1.5 parts of 1:1 mixture of ortho- and para-chlorotoluene, about 0.12 part of an emulsifier and about 96.88 parts of water as disclosed in German Patent 1,041,245, with about 1.5 parts of a polycarbonate prepared by reacting diphenyl carbonate with about 90 mol percent of 2,2-bis-(4-hydroxy phenyl)-propane and about 10 mol percent of 2,2-bis-(4-hydroxy-3-allyl phenyl)-propane. The polycarbonate used to prepare the emulsifier for sizing the glass fibers has a relative viscosity in a 0.5% solution in methylene chloride at about 25° C. of 1.317.

It is to be understood that this example is given for the purpose of illustration and that any other suitable polycarbonate, sizing solution or the like could have been used provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A polyarylcarbonate containing glass fibers which have been previously sized with a polyarylcarbonate resin.

2. An injection molding compound comprising granules of a polyarylcarbonate having incorporated therein from about 1% to about 60% by weight of the granule of glass fiber which has been sized with a polyarylcarbonate prior to incorporation into a molding compound.

3. A polyarylcarbonate containing glass fibers which have been sized with a polyarylcarbonate resin wherein the glass has a filament diameter between about $10 \times 10^{-5}$ to about $80 \times 10^{-5}$ inches, the size content of the fibers being from about 0.1 to about 5% by weight, the sizing being a polycarbonate based on mixtures of aromatic dihydroxy compounds free of substitution with up to about 25 mol percent of beta-alkenyl substituted aromatic dihydroxy compounds and the length of the fibers being from about 0.1 to about 10 mm.

4. A method for preparing an improved polycarbonate reinforced with glass fibers which comprises mixing a polycarbonate with a glass fiber, the glass fiber having been previously sized with a polyarylcarbonate.

5. The method of claim 4 wherein said sizing is a polyarylcarbonate based on 2,2-bis-(4-hydroxy phenyl)-propane.

6. The method of claim 4 wherein said sizing is based on a polyarylcarbonate prepared from 2,2-bis-(4-hydroxy phenyl)-propane and 2,2-bis-(4-hydroxy-3-allyl phenyl)-propane.

7. The method of claim 4 wherein said sizing is a polycarbonate prepared from an aromatic dihydroxy compound mixed with a beta-alkenyl substituted aromatic dihydroxy compound.

8. The method of claim 4 wherein said sizing is a mixed polycarbonate prepared from an aromatic dihydroxy compound mixed with a beta-alkenyl substituted aromatic dihydroxy compound and said sizing is applied as a solution of from about 0.5 to about 5% by weight of the polyarylcarbonate in an inert organic solvent therefor.

9. The method of claim 4 wherein said polycarbonate to be filled with glass fibers is a mixed polyarylcarbonate based on 2,2-bis-(4-hydroxyphenyl)-propane and 1,1-bis-(4-hydroxyphenyl)-cyclohexane.

10. The method of claim 4 wherein the sized glass fiber is mixed with the reactants before the polycarbonate polymer is finally prepared.

11. The method of claim 4 wherein the sized polycarbonate polymer is extruded.

12. The method of claim 4 wherein the sized polycarbonate is molded.

13. The method of claim 4 wherein glass fiber material having a filament diameter of from about $10 \times 10^{-5}$ inches to about $80 \times 10^{-5}$ inches is sized with from about 0.1 to about 5 percent by weight of a polycarbonate and from about 1 to about 60 percent by weight of the sized glass fiber is mixed with the polycarbonate.

14. The method of claim 13 wherein the polycarbonate with which the glass fiber is sized in a mixed polycarbonate derived from about 0.5 to about 25 mol percent of a beta-alkenyl substituted dihydric phenol based on the total amount of dihydric compound employed in the preparation of the polycarbonate, the polycarbonate into which the sized glass fiber is incorporated is in melt form, and the melt is solidified after being mixed with the sized glass fiber by cooling.

References Cited

FOREIGN PATENTS 697,698  11/1964  Canada.

OTHER REFERENCES

W. F. Christopher and D. W. Fox, Polycarbonates, Reinhold Publishing Corp, New York, (1962) pp. 151–156 relied upon.

MORRIS LIEBMAN, *Primary Examiner.*

L. T. JACOBS, *Assistant Examiner.*